(No Model.)
C. A. DAVIS.
TWO WHEELED VEHICLE.
No. 425,410. Patented Apr. 15, 1890.
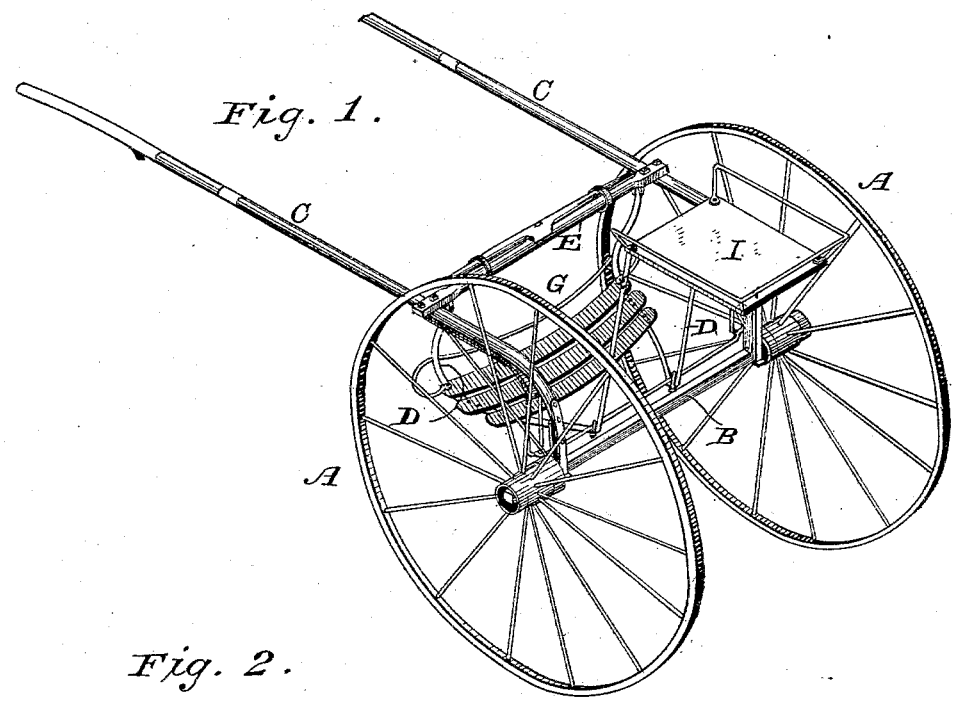
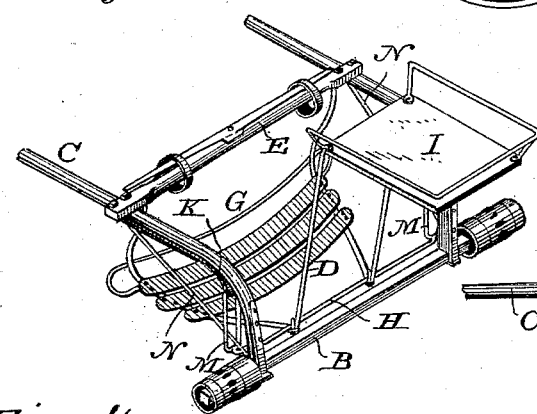
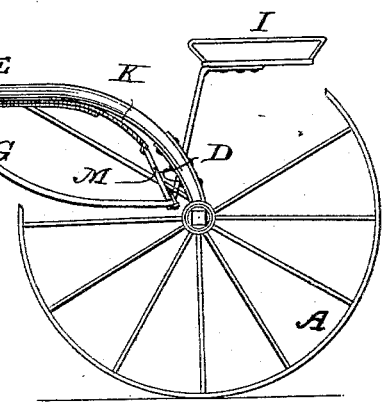
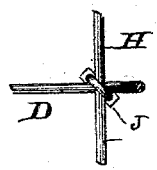
Witnesses
Wm. A. Skinkle
John Ible
Inventor
Charles A. Davis
By his Attorney
David H. Mood.

UNITED STATES PATENT OFFICE.

CHARLES A. DAVIS, OF PEORIA, ILLINOIS.

TWO-WHEELED VEHICLE.

SPECIFICATION forming part of Letters Patent No. 425,410, dated April 15, 1890.

Application filed February 16, 1888. Serial No. 264,201. (No model.)

*To all whom it may concern:*

Be it known that I, CHARLES A. DAVIS, a citizen of the United States, residing at Peoria, in the county of Peoria and State of Illinois, have invented certain new and useful Improvements in Two-Wheeled Vehicles; and I do hereby declare that the following is a full, clear, and exact description of the invention, which will enable others skilled in the art to which it appertains to make and use the same.

This invention relates to two-wheeled vehicles.

The object of the invention is to produce a two-wheeled vehicle so constructed that the motion of the horse is not communicated to the seat of the vehicle. Furthermore, the object of the invention is to produce a two-wheeled vehicle so constructed that in case of the breaking of any of the parts of the vehicle the seat can only fall as low as the axle; and, furthermore, the object is to produce a cart so constructed as to be capable of being mounted without stepping over a seat-supporting bar.

With these objects in view my invention consists in a two-wheeled vehicle made substantially as hereinafter described and claimed.

In the accompanying drawings, Figure 1 is a perspective view of a cart made in accordance with my invention. Fig. 2 is a similar view, the supporting-wheels being removed in order to show the construction of the cart. Fig. 3 is a side view of the cart, and Figs. 4 and 5 represent details of construction of the vehicle.

In the drawings, A A represent the supporting-wheels of the vehicle, B the axle, and C C the shafts. The shafts are attached rigidly to the axle, as is usual in carts of this kind.

The seat of the vehicle is mounted upon a frame D, attached at its front end to the whiffletree-bar E, by means of a hinge-joint F, so that sufficient motion is allowed to compensate for the horse motion. The frame is fastened in the manner specified to the whiffletree-bar at each side near the shafts, and from these points extend downward and toward the axle, forming a means of supporting cross-pieces composing the foot-rest G. The frame rests upon and is supported by a cross-piece H, and extends upward and forms a support for the seat I. The frame D is held in place on the bar H by means of the clips J, which encircle the bar and the frame.

The springs which I employ are designated by the letters K K. These are secured to the under side of the shafts in line therewith, and are attached at their rear ends to the upturned ends of the supporting-bar H by means of the loops M. The springs are attached to the shafts by means of clips, so that their position may be changed at will, in order to regulate the balance of the cart and adapt it to put no weight on the horse's back whatever may be the weight of the occupant of the seat. If desired, the springs may be mounted on the top of the shafts instead of on the bottom, and in this case the springs are simply inverted.

Extending from the axle to the shafts at a point near the whiffletree-bar are the braces N, which serve to strengthen and lend rigidity to the frame of the vehicle. These braces are arranged beneath the ends and pass through the loops M of the springs, so that in case of breakage of the springs the weight of the seat will come through the loop, be brought upon the brace, and be thus prevented from falling to the ground. It will also be clear that in case of the breakage of the loop-bar or spring the seat-frame, which extends diagonally over the axle, can only fall as far as the axle, and thus any material damage to the driver will be prevented.

The bar or cross-piece H, upon which the frame carrying the seat and foot-rest is supported, is arranged as close to the axle of the cart as the proper movement caused by the resiliency of the spring will permit, so that, inasmuch as the arc described by the shafts when the cart is in motion has the axle of the vehicle at its center, the seat which is arranged upon the bar H, close to the axle, has no perceptible horse motion while the cart is in use.

Having thus described my invention, what I claim as new, and desire to secure by Letters Patent, is—

In a two-wheeled vehicle, the combination, with each shaft, of a spring secured to its under side and projecting rearwardly, a loop secured to the rear end of each spring, a cross-brace secured at its ends to the loops, a bent frame pivotally secured to the whiffletree-bar at one end and resting upon and secured to the cross-brace near its bent portion, forming the seat and a foot-rest, and two braces secured to the axle, one extending through each of the loops and secured to the shaft at the front end of the spring, for the uses and purposes herein set forth, substantially as described.

In testimony whereof I affix my signature in presence of two witnesses.

CHARLES A. DAVIS.

Witnesses:
DAVID H. MEAD,
A. KEITHLEY.